United States Patent [19]
Orlen et al.

[11] Patent Number: 5,387,981
[45] Date of Patent: Feb. 7, 1995

[54] FACSIMILE COMMUNICATION WITH SELECTIVE CALL RECEIVERS

[75] Inventors: Noah Orlen, Boca Raton; Zaffer Merchant, Lantana, both of Fla.

[73] Assignee: Motorola, Inc., Schaumburg, Ill.

[21] Appl. No.: 102,186

[22] Filed: Aug. 5, 1993

[51] Int. Cl.[6] .............................................. H04N 1/00
[52] U.S. Cl. .................................... 358/400; 358/426; 341/87
[58] Field of Search ..................... 358/400, 426, 261.1, 358/261.2, 261.3, 467, 433; 341/87; 382/56; 340/825.44; 375/122; 370/118

[56] References Cited

U.S. PATENT DOCUMENTS

| 3,726,993 | 4/1973 | Lavallee | 340/347 |
|---|---|---|---|
| 3,927,251 | 12/1975 | White et al. | 358/261.3 |
| 4,034,406 | 7/1977 | Tsuchiya et al. | 358/261.1 |
| 4,145,686 | 3/1979 | McMurray et al. | 340/347 |
| 4,186,415 | 1/1980 | Takayama | 358/260 |
| 4,232,375 | 11/1980 | Paugstat et al. | 364/900 |
| 4,633,490 | 12/1986 | Goertzel et al. | 358/426 |
| 4,897,733 | 1/1990 | Sakaguchi et al. | |
| 4,944,023 | 7/1990 | Imao et al. | 382/37 |
| 5,060,036 | 4/1990 | Hirata | |
| 5,227,893 | 7/1993 | Ett | 358/400 |
| 5,282,062 | 1/1994 | Ohara et al. | 358/467 |

FOREIGN PATENT DOCUMENTS 0016073 1/1989 Japan.

Primary Examiner—Edward L. Coles, Sr.
Assistant Examiner—Madeleine Anh-Vinh Nguyen
Attorney, Agent, or Firm—Keith A. Chanroo; John H. Moore

[57] ABSTRACT

A selective call communication system (100) includes an encoder (508) for encoding and compressing the data to form compressed data, and a controller (22) for transferring the compressed data to a selective call terminal (28). The selective call terminal (28) includes a receiver (302) for receiving the compressed data. A region detector (308) for recovering the compressed data within a predefined information region (42) and a processor (20) for processing the compressed data. The processor (20) includes an identifier (310) for identifying white spaces in the compressed data and an eliminator (312) for eliminating the white spaces being identified. A transmitter (30) for transmitting the compressed data being processed to at least one selective call receiver (40).

37 Claims, 6 Drawing Sheets

FACSIMILE COMMUNICATION WITH SELECTIVE CALL RECEIVERS

FIELD OF THE INVENTION

This invention relates in general to facsimile communications and more specifically to a method and apparatus for providing facsimile communication with selective call receivers.

BACKGROUND OF THE INVENTION

Contemporary selective call receiver messaging systems employ messaging schemes that can deliver voice, numeric, or alphanumeric messages to its user. The majority of selective call systems transmit address and message information using a protocol such as GSC (Motorola's Golay Sequential Code) or POCSAG (Great Britain's Post Office Code Standardisation Advisory Group). To originate a message or page, a base station or selective call terminal is typically accessed via a Public Switch Telephone Network (PSTN) from a telephone. As a voice message entry device, the telephone is acceptable but when data needs to be entered, an alternative means of entry is desirable. Alternative entry devices such as computer terminals or custom entry devices work well if the originator can convey information to the user in a textual format. Unfortunately, when a user must convey a large amount of information, existing selective call messaging (paging) systems and data transport protocols do not gracefully allow for the transmission of either long textual messages or messages containing graphical data. This is because selective call receivers are powered by limited energy content battery supplies that are quickly degraded when receiving and displaying long messages.

While contemporary facsimile communication equipment employ data compression techniques in their coding formats, such data compression techniques are inadequate for adequately preserving the battery lives of the selective call receivers. Furthermore, the long data messages indicative of facsimile communication would also destroy the battery saving schemes currently being employed with selective call communication systems. Therefore, because in facsimile communications long textual or graphical data are transmitted to the selective call receivers, the selective call receivers' battery lives are severely degraded. This makes facsimile communication unattractive to the users of selective call receivers even though the need exists for facsimile communication.

Thus, what is needed is a method and apparatus, in a selective call communication system, for providing facsimile communication that do not degrade battery life and destroy the battery saving schemes currently being employed in the selective call communication systems.

SUMMARY OF THE INVENTION

In a selective call communication system, a method of facsimile communication comprises the steps of (a) encoding and compressing the data to form compressed data; (b) transferring the compressed data to a selective call terminal; (c) receiving the compressed data at the selective call terminal; (d) recovering compressed data within a predefined information region; and (e) processing the compressed data. The step of processing in the selective call terminal further comprises the steps of (f) identifying white spaces in the compressed data; (g) eliminating the white spaces being identified; and (h) transmitting the compressed data being processed to at least one selective call receiver.

A selective call communication system comprises means for encoding and compressing the data to form compressed data, and means for transferring the compressed data to a selective call terminal. The selective call terminal comprises a receiver for receiving the compressed data. Means for recovering recovers the compressed data within a predefined information region and a processor processes the compressed data. The processor comprises means for identifying white spaces in the compressed data and means for eliminating the white spaces being identified. A transmitter transmits the compressed data being processed to at least one selective call receiver.

DESCRIPTION OF A PREFERRED EMBODIMENT

Figure 1:
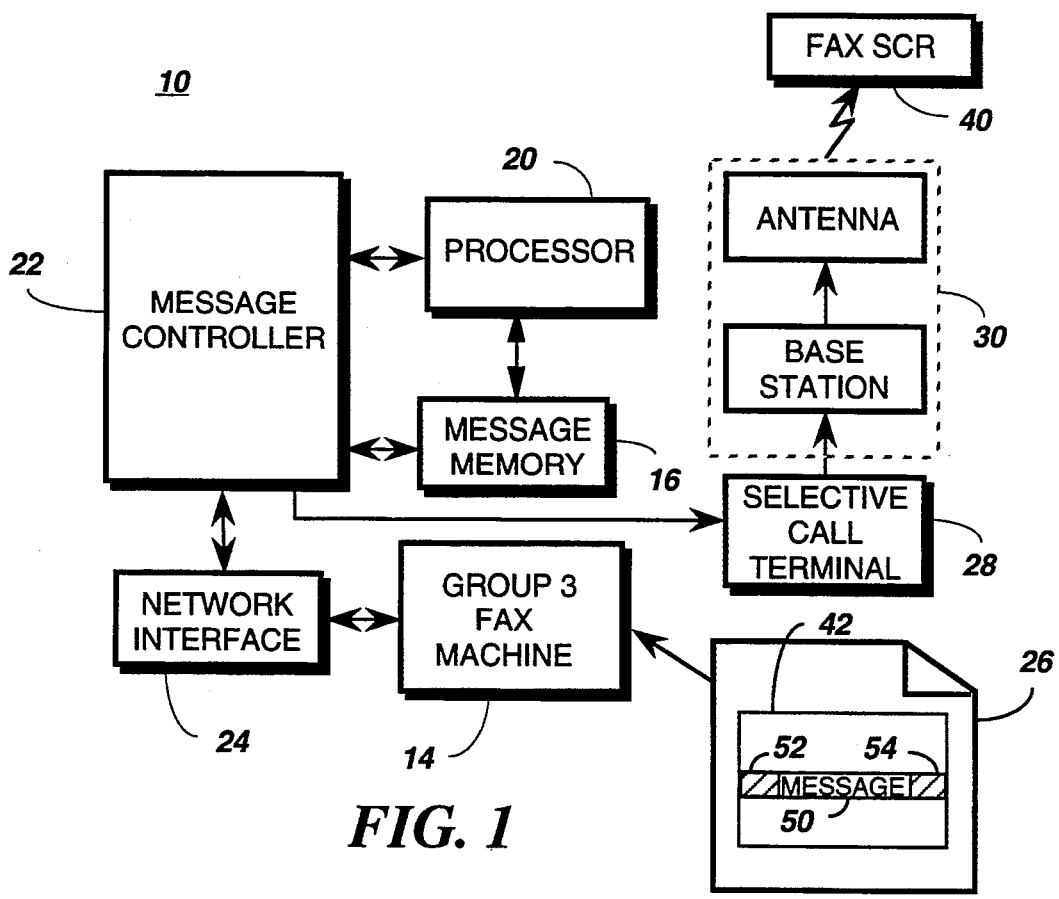
FIG. 1 is an electrical block diagram of a selective call communication system in accordance with the preferred embodiment of the present invention.

Referring to FIG. 1, an electrical block diagram of a selective call communication system 10 is shown in accordance with the preferred embodiment of the present invention. Operationally, a user enters a source document 26 into a facsimile (FAX) machine 14; the FAX machine 14 reads (or scans) and quantizes the image (message or data) contained thereon. Preferably, the message is contained in a predefined information region 42 of the source document 26. The FAX machine 14 is coupled to a message controller 22 via a network interface 24 which is ultimately coupled to a selective call terminal 28. The network interface 24 is well known to one of ordinary skill in the art and can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 need not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the user (or sender) would call the subscriber's paging service provider using a conventional telephone to enter, for example, the user's cap-code number (a unique number assigned by the paging service provider that corresponds to the actual coded address of a selective call receiver). The paging service provider maintains a list of FAX capable cap-code numbers (addresses) and upon receiving the entered cap-code number, a procedure to receive a facsimile message is initiated. The user, according to the preferred embodiment, writes a message (preferably a handwritten message) in the predefined information region 42 of the source document 26. The source document 26 is then scanned into the FAX machine. The processing of the hand written message includes encoding, compressing and transferring the message to the selective call terminal 28 which will produce a paging FAX message that will be transmitted to the targeted subscriber. The method, protocol, and apparatus required for the transmission of the paging message will be discussed in detail below.

After the document has been entered into the FAX machine 14, the entire source document 26 including the handwritten message contained in the predefined information region 42 is scanned and quantized. Thereafter, the information is encoded and compressed in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the message is Group III encoded and compressed, it is transferred to the message controller 22 via the PSTN 24. The message controller 22 directs the message to a processor 20 for providing additional processing of the message suitable for selective call communication. After storing at least a portion of the message in a message memory 16, the processor 20 and the message controller 22 begin processing the message.

This additional processing according to the preferred embodiment of the present invention is necessary for extending facsimile communication to include selective call communication without destroying the selective call receivers' battery lives and battery saving features. For example, assuming a resolution of 200 by 200 dots-per-inch (dpi) or dots-per-2.5 cm and assuming a message containing 35 lines having an average of 50 characters-per-line on an A4 page size (approximately 21.0 cm by 29.7 cm) containing only text. To transmit this message when compressed, assuming a byte oriented serial protocol with no error correction, would take approximately 60 seconds at 1200 baud (one baud is defined as one symbol having eight information bits-per-second). The resulting transmission time of almost sixty seconds-per-page is impractical in terms of the economics of using a radio frequency paging channel. Therefore, there must be a substantial reduction in transmission time before FAX paging becomes attractive to current subscribers of selective call communication systems.

As can be seen, the transmission of the FAX message must yield an improvement when compared with binary data and Group III facsimile machines. When this example is presented using a typical over-the-air coding scheme such as GSC (Motorola's Golay Sequential Code) or POCSAG (Great Britain's Post Office Code Standardisation Advisory Group), the overhead increases by the amount of parity bits associated with the code selected. This increases the total transmission time by the ratio of the coded data to the un-coded data. In the case of GSC which is a (23,12) code (23 total bits of which 11 are parity bits and 12 are data bits), one would expect to see an increase in time of approximately 109 percent as compared to the un-coded data.

Figure 3:
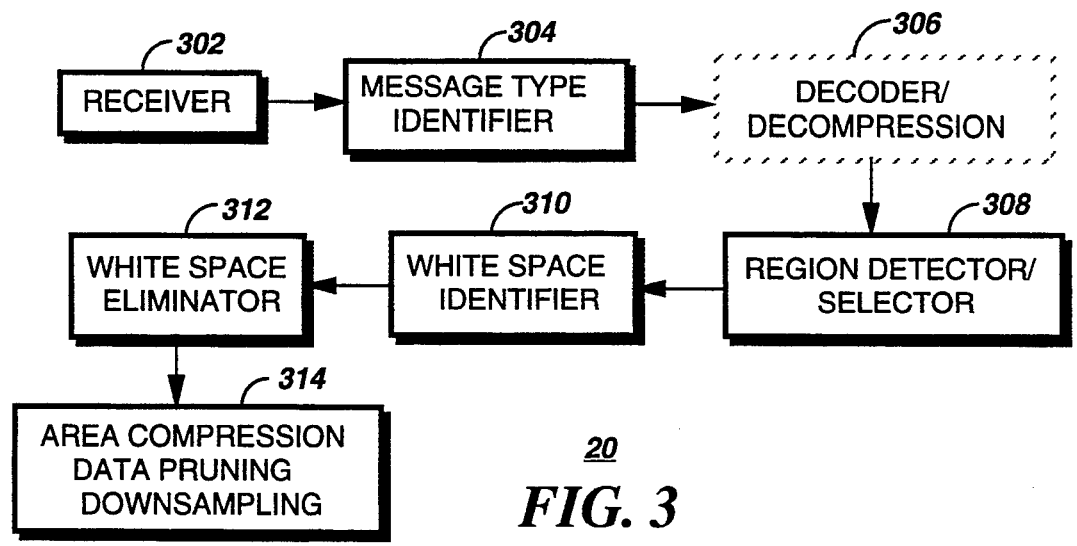
FIG. 3 is an electrical block diagram of a processor of the selective call communication system of FIG. 1.

Referring to FIG. 3, an electrical block diagram of the processor 20 of FIG. 1 is illustrated. When the message is received by a receiver 302 of the processor 20, a message type identifier 304 identifies whether the message is a FAX or regular type paging message. The processing of a regular paging message is well known to one of ordinary skill in the art. However, when the message is determined by the message type identifier 304 to be a FAX message (or data), in the preferred embodiment of the invention, the decoding and decompression performed by a decoder/decompression block 306 is by-passed. That is, the preferred embodiment of the present invention does not require the message to be decompressed before it is processed by the processor 20 of selective call communication system 10. A region detector/selector 308 recovers the compressed message contained in the predefined information region 42 (FIG. 1). The region detector/selector 308 can achieve an additional degree of compression of the compressed message when the compression performed by the FAX machine is less than the compression indirectly achieved by the region/selector 308 selecting the predefined information region 42. A white space identifier 310 thereafter identifies white spaces (or blank spaces) in the compressed message that was derived from the predefined information region 42. A white space eliminator 312, in response to the white space identifier 310, eliminates the line or lines of the message in which the white space identifier 310 determines that the number of white spaces equals or exceeds a threshold value or number of white spaces. The white space identifier 310 compares white spaces with at least one! predetermined threshold value indicative of a line (or codeword) of the compressed message substantially comprising white spaces. The white space identifier 310 and eliminator 312 will be discussed in detail below. An area compression/data pruning/downsampling block 314 discards information that are determined to be unnecessary. The compressed message subsequent to being processed is preferably stored in the message memory 16.

Referring again to FIG. 1, the resulting compressed FAX message is coupled to the selective call terminal 28 via the message controller 22. Specifically, the message controller 22 retrieves the compressed FAX message from the message memory 16 and the selective call terminal 28 encodes the compressed FAX message using a protocol suitable for the transmission of information via a radio frequency link. As is well known, these protocols add error detection and correction capabilities to the information link, thus insuring the delivery of error free data to the paging subscriber. The selective call terminal 28 also serves to control a transmitter 30 (or transmitters in a multi-cast system) and to generate a queue for incoming and outgoing paging FAX messages.

When the selective call terminal 28 has completed processing the incoming compressed FAX message to form a selective call FAX message, the transmitter 30, which comprises a base station and an antenna, broadcasts a signal modulated with the compressed FAX message representing the selective call address and the compressed FAX message. A selective call receiver 40 detects its address, recovers the message, alerts the user, and makes the received information available for presentation to the user in a variety of formats including but not limited to characters, graphics and audio. Some specialized applications that can be accommodated by the preferred embodiment of the selective call communication system 10 are electronic mail, storage, retrieval, and forwarding of facsimile messages, and integration of text with graphics into a compound document architecture compatible with industry standard computer productivity software applications.

Figure 2:
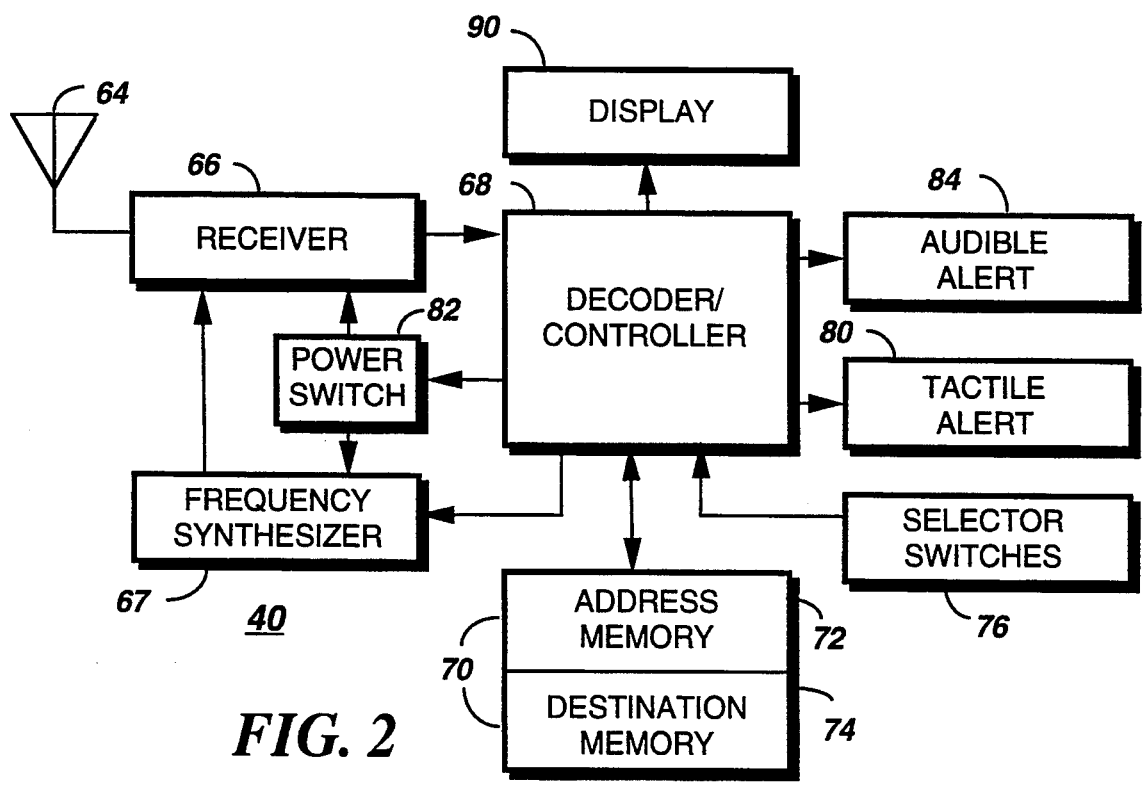
FIG. 2 is an electrical block diagram of a selective call receiver in accordance with the preferred embodiment of the present invention.

Referring to FIG. 2, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as the tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call communication system's frequency or the, paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 4:
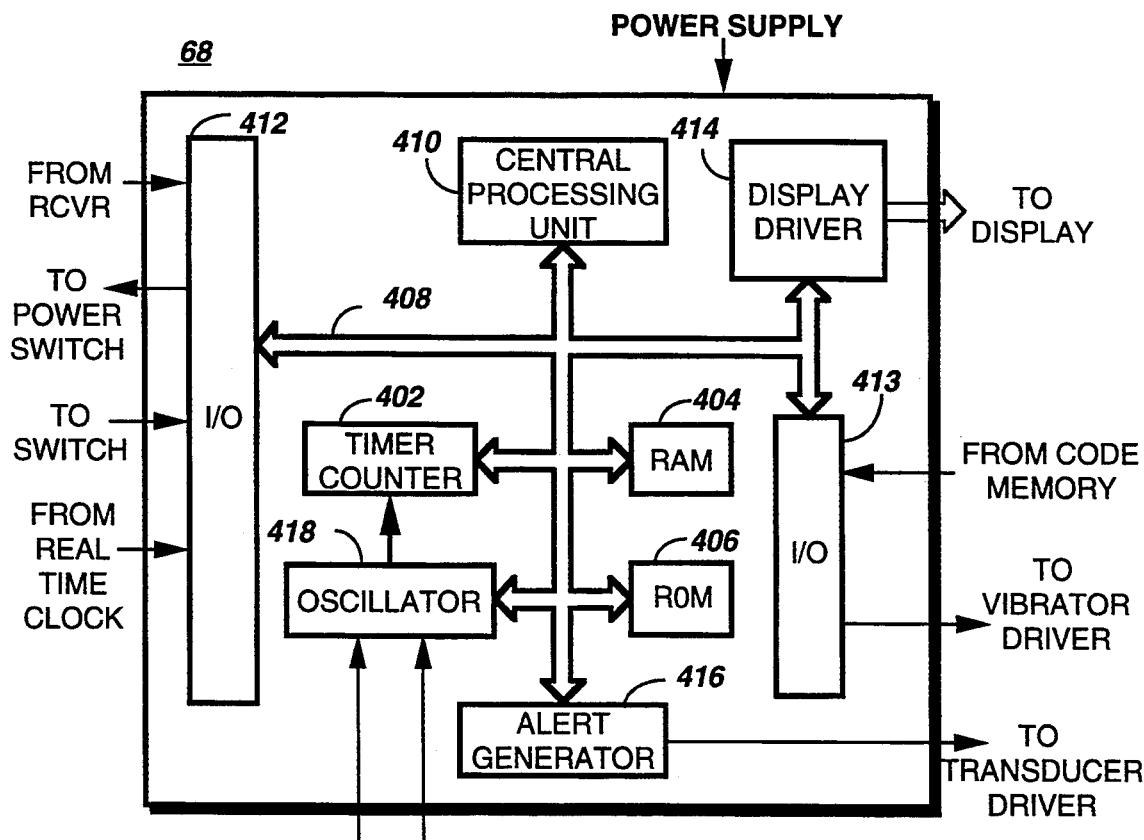
FIG. 4 is an electrical block diagram of a microcomputer based decoder/controller used in the selective call receiver of FIG. 2.

The controller/decoder 68 of FIG. 2 can be implemented utilizing a microcomputer as shown in FIG. 4. FIG. 4 is an electrical block diagram of a microcomputer based decoder/controller suitable for use in the selective call receiver of FIG. 2. As shown, the microcomputer 68 is preferably of the family of MC68HC05 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of FAX paging messages which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410, and when the received address is the same as that stored within the code-plug memory which couples into the microcomputer through, for example an I/O port 413, the selective call FAX message is received and stored in RAM 404. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display 90 (FIG. 2) such as an LCD (liquid crystal display). It can be appreciated by one of ordinary skill in the art that the display 90 on the selective call receiver 40 is substantially smaller than a computer screen. This difference in size, for example, requires the source document 26 to be partitioned into the predefined information region 42 for receiving the user's handwritten message. The predefined information region 42 (FIG. 1) is sized such as to enable the FAX message to be easily displayed on the display 90 of the selective call receiver 40 without excessive processing. When the selective call receiver 40 receives its address, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

The battery saver operation is controlled by the CPU 410. The battery saving signals are directed over the data bus 408 to the I/O port 412 which couples to the power switch 82. Power is periodically supplied to the receiver to enable decoding of the received selective call receiver address signals and the selective call FAX message which is directed to the selective call receiver 40. The message information, preferably comprise the selective call FAX message, is stored and ready to be displayed on the display 90.

Figure 5:
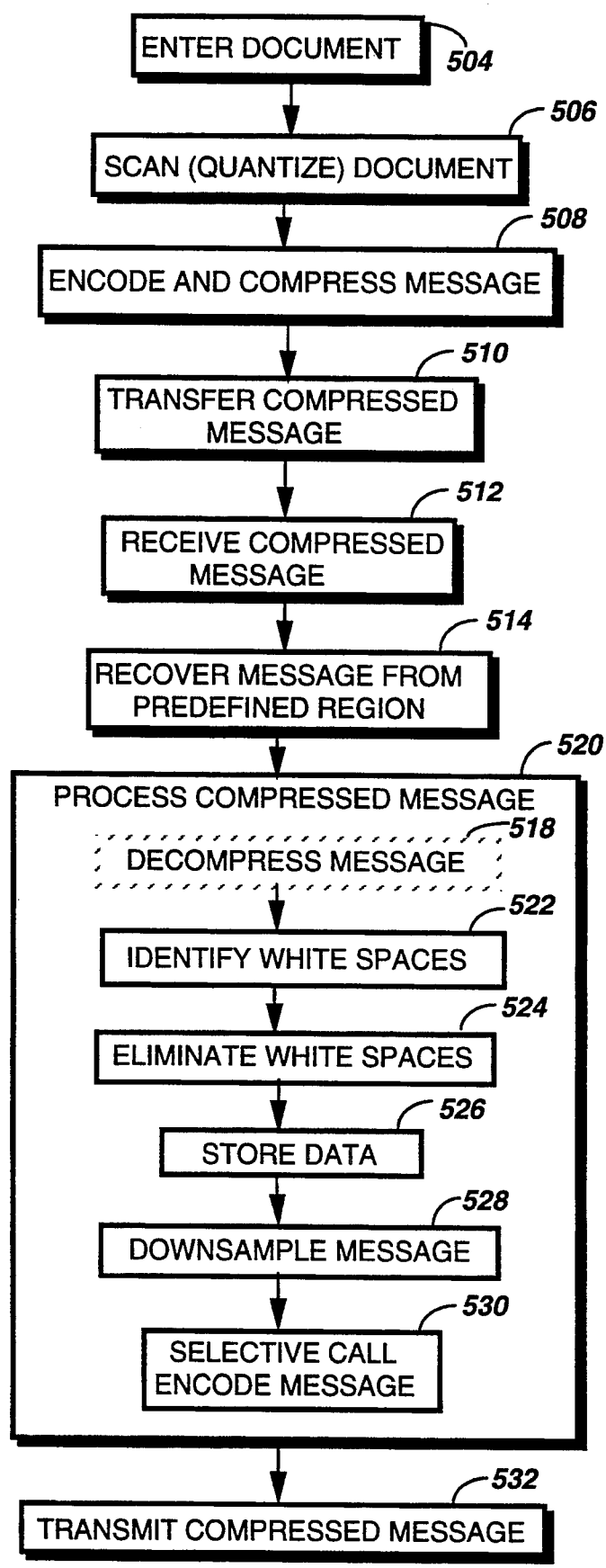
FIG. 5 is a flow diagram illustrating facsimile communication in accordance with the preferred embodiment of the present invention.

Referring to FIG. 5, a flow diagram illustrating facsimile communication is shown in accordance with the preferred embodiment of the present invention. When the source document 26 has been entered, step 504, the FAX machine 14 scans and quantizes the information on the source document 26, step 506. The quantized information is then compressed and encoded, preferably according to the Group III facsimile standard, step 508. The encoded and compressed data is transferred from the FAX machine 14 to the message controller 22 via the PSTN 24, step 510. The message controller 22 receives the compressed data and stores it in memory to be accessed by the processor 20 which processes the compressed data before transmission to its designated selective call receiver 40, step 512. The region detector/selector 308 accesses the data and recovers the compressed message contained in the predefined region of the compressed data, step 514. Subsequent to the compressed message being recovered, the processor 20 begins processing the compressed message, step 520. According to the preferred embodiment, the processor by-passes the step of decompressing the compressed message, and begins processing the message in its compressed state. The processing therefore begins with the processor 20 identifying white spaces in the messages, step 522.

Figures 6, 7:
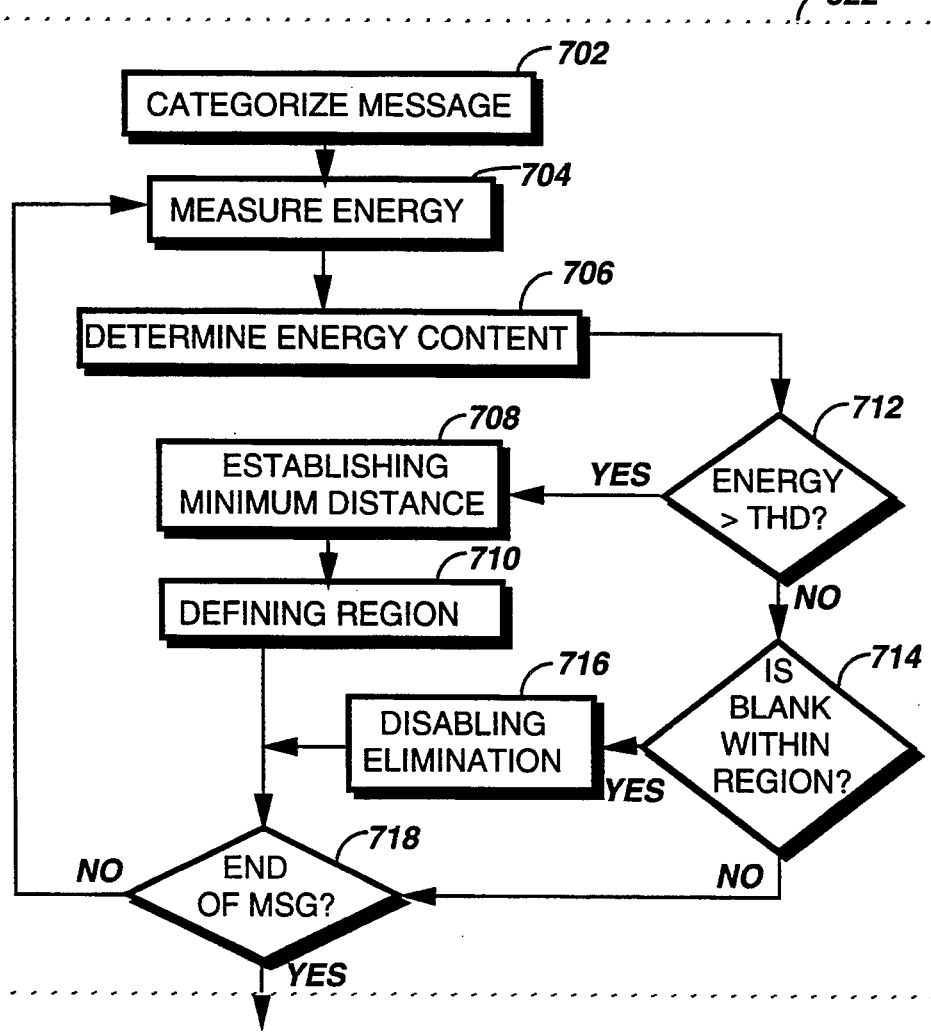
FIG. 6 is a flow diagram illustrating the details of message compression of FIG. 5
FIG. 7 is a flow diagram illustrating the details of an alternative embodiment of message compression of FIG. 5.

Referring to FIG. 6, a flow diagram is shown illustrating the details of message compression of FIG. 5, and particularly, the step of identifying whites spaces in the messages. The identifying step 522 preferably includes the step of encoding and representing the compressed message as a plurality of codewords, step 602. Each line of the compressed message thereafter comprises at least one codeword. A plurality of threshold values are generated and stored in memory, step 604. The plurality of threshold values indicate all possible codewords that can occur and be determined to comprise substantially all whites spaces. In identifying whether a codeword is comprised substantially of white spaces, the processor 20 compares each codeword with the plurality of threshold values, step 606. The codewords that are substantially similar to at least one of the plurality of threshold values are determined to be codewords comprising substantially all whites spaces, step 608. For example, these codewords are characterized as codewords having an insubstantial amount of information, and therefore can be discarded without affecting the integrity of the message.

Referring again to FIG. 5, the processor 20 continues by eliminating each line of compressed message being determined to have at least one codeword comprising substantially all white spaces, step 524. This elimination step is repeated until every line of compressed message is checked and eliminated as required. The resulting compressed message is then stored in memory, step 526. The stored compressed message is then downsampled, in step 528. The downsampling step, as is well known to one of ordinary skill in the art, throws out unnecessary information from the compressed message. The compressed message is then selective call encoded as discussed above, step 530 and transmitted to the intended selective call receiver 40, the address of which is encoded in the selective call FAX message being transmitted thereto, step 532.

In this way, the invention requires the user to enter a message to be FAXed. The message is handwritten in a predefined information region which enables the message to be displayed easily on the display of the selective call receiver. After the message is processed by a conventional FAX machine, white spaces exceeding a threshold value is determinative that a line of the message can be eliminated without seriously degrading the message's integrity. This "blank line" elimination from the compressed message results in a second compression being performed on the compressed message. The second compression step reduces the Group III FAX encoded data to a message size that can be transmitted according to current paging standards without overloading the communication system. When encoded, the compressed message results in a message which elegantly fits within the constraints of the selective call communication without seriously degrading battery life or battery saving features. Therefore, the blank line elimination and the FAX machine data compression produce an encoded selective call FAX message that makes FAX transmission to a selective call receiver more attractive to both service providers and subscribers because the message is reduced to require a significant decrease in transmission time.

Referring to FIG. 7, a second embodiment of the present invention is shown in conjunction with FIG. 5. The description of FIG. 5 remains the same for the second embodiment of the present invention per the preferred embodiment as discussed above. The compressed message is similarly not decompressed. In FIG. 7, block 522 represents the identification of white spaces. Specifically, in step 702, the identifier categorizes the compressed message into a plurality of rows. The energy is measured in each of the plurality of rows, step 704. Preferably, the energy in each of the plurality of rows are measured by accumulating the number of picture elements (black pels) in each of the plurality of rows of the compressed message. The accumulated black pels is used to determine the energy content of each of the plurality of rows of the compressed message, step 706. In step 712, the energy content of each row is compared with a threshold value established to determine whether each row has a high or low energy content value. When the energy content equals or exceeds the threshold value, the row is categorized as a high energy content row, and when the energy content is below the threshold value, the row is categorized as a low energy content row. Therefore, in step 712, when the row is categorized as a high energy content row, a minimum distance is established, step 708. The minimum distance includes at least two high energy rows bordering at least one low energy row therebetween. Step 710 defines a region including the at least two high energy rows within the minimum distance and including the at least one low energy row therebetween. At step 712, when the row is determined to be a low energy row, the low energy row is referred to as a blank row, and step 714 checks if the low energy (blank) row occurs with the region being defined. If so, the eliminator is disabled, step 716. Even though the row has a low energy content, the row is not eliminated because its presence adds integrity to the message content. However, when the low energy content falls outside of the established region, the end of message block is checked, step 718, and that row is identified for elimination. If it is the end of the message, the process continues as per FIG. 5. When the end of message has not been detected, the process continues to step 704 until the end of message is detected.

In this way, the second embodiment of the invention categorizes the compressed message into a plurality of rows. The plurality of rows of the compressed message that have been determined to be low energy rows (substantial blank rows) occurring within an established region are eliminated. The "blank row" elimination compresses the message for a second time. Although it is desirous to compress the message, the integrity of the compressed message is not compromised because when a row of the compressed message is a blank row, that blank row is not eliminated unless it occurs outside thee established minimum distance. This preserves the message's integrity while compressing the message for generating a selective call FAX message that elegantly fits within the constraints of the selective call communication system without seriously degrading battery life or battery saving features. Therefore, the blank row elimination and the established region produce an encoded selective call FAX message that makes FAX transmission to selective call receivers more attractive to both service providers and subscribers because the compressed message is reduced to require a significant decrease in transmission time while maintaining message integrity.

The source document 26 (FIG. 1) illustrates the message 50 within the predefined information region 42. The message 50 and additional areas 52 and 54 of the predefined information region comprise the final message that is encoded and transmitted to the selective call receiver after the blank rows are eliminated from the compressed message. As illustrated, the predefined information region 42 comprising the handwritten message is reduced to areas 52, 50, and 54. It can therefore be appreciated that the message to be FAXed is significantly reduced to result in a FAX message that may be transmitted using less air time.

Referring to FIGS. 5 and 7, a third embodiment of the present invention is illustrated with the following changes. In FIG. 5, the third embodiment is similar to the preferred embodiment except that the processing step 520 begins with decompressing the compressed message, step 518. In FIG. 7, the identifying step is similar to the second embodiment of the present invention except that the categorizing step 702 categorizes the decompressed message into a plurality of rows and columns. Similarly, steps 706, 708, 710, 712, 714, and 716 are all similar to the second embodiment except that the same steps are performed on the rows as well as the columns for the decompressed message. Preferably, in the third embodiment of the present invention, the substantially blank rows outside the established regions are eliminated from the decompressed message in a first pass. At the end of message 718, the process is repeated for the plurality of columns in the second pass. In the second pass, the plurality of columns of the message, preferably after the blank rows have been eliminated, are processed and the substantially blank columns outside the established region are eliminated similar to the first pass. In this way, the third embodiment eliminates both blank rows and columns thereby further compressing the message while maintaining its integrity. The difference in results can be appreciated by referring to the source document 26 (FIG. 1). With the third embodiment, the message encoded and transmitted to the selective call receiver 40 comprises only the message area 50 because, in the second pass, the areas 52 and 54 are determined to be substantially blank columns which are accordingly eliminated during the blank column elimination. As illustrated, the predefined information region 42 comprising the handwritten message is reduced message area 50. It can therefore be appreciated that the message to be FAXed is significantly reduced to result in a message FAX that may be transmitted using less air time.

Figure 8:
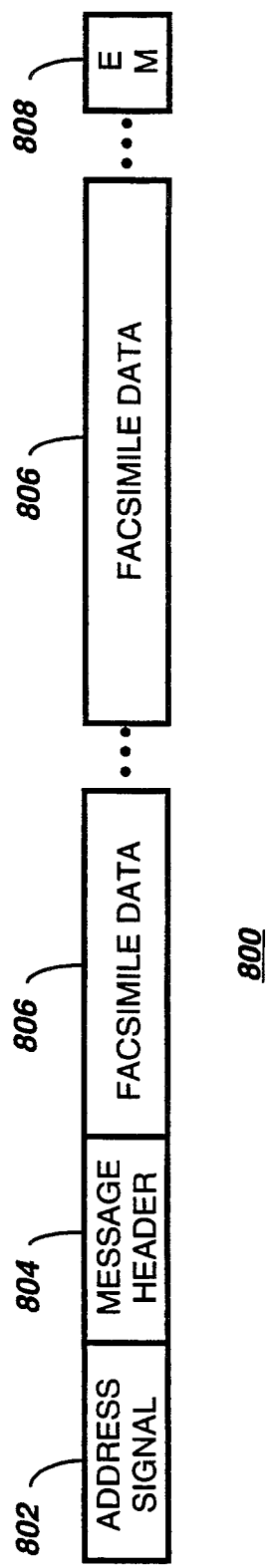
FIG. 8 is a protocol diagram of a selective call information signaling format in accordance with the preferred embodiment of the present invention.

Referring to FIG. 8, a protocol diagram of a selective call communication format is shown in accordance with the preferred embodiment of the present invention. The signaling protocol is used for addressing and transmitting facsimile data to the selective call receiver 40 using any facsimile standard. A FAX paging message packet 800 comprises a selective call address 802, a facsimile message header 804, data blocks 806 encoded in Group III facsimile data, and an end-of-message flag 808. The end-of-message flag 808 can be omitted without compromising the integrity of this signaling format. The address signal 802 comprises a conventional selective call address of a type that is well known to one of ordinary skill in the art. The message header 804 contains information on the data block length, FAX protocol type, and possibly an encryption type for use in a secure FAX messaging system. Following the message header 804 is the data block 806 containing standard facsimile data. This embodiment can be used in conjunction with a conventional FAX machine to receive FAX messages via a wireless data channel. Furthermore, when used in conjunction with a personal computer or the like (e.g., a laptop computer), the selective call receiver as illustrated in FIG. 2 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

Figure 9:
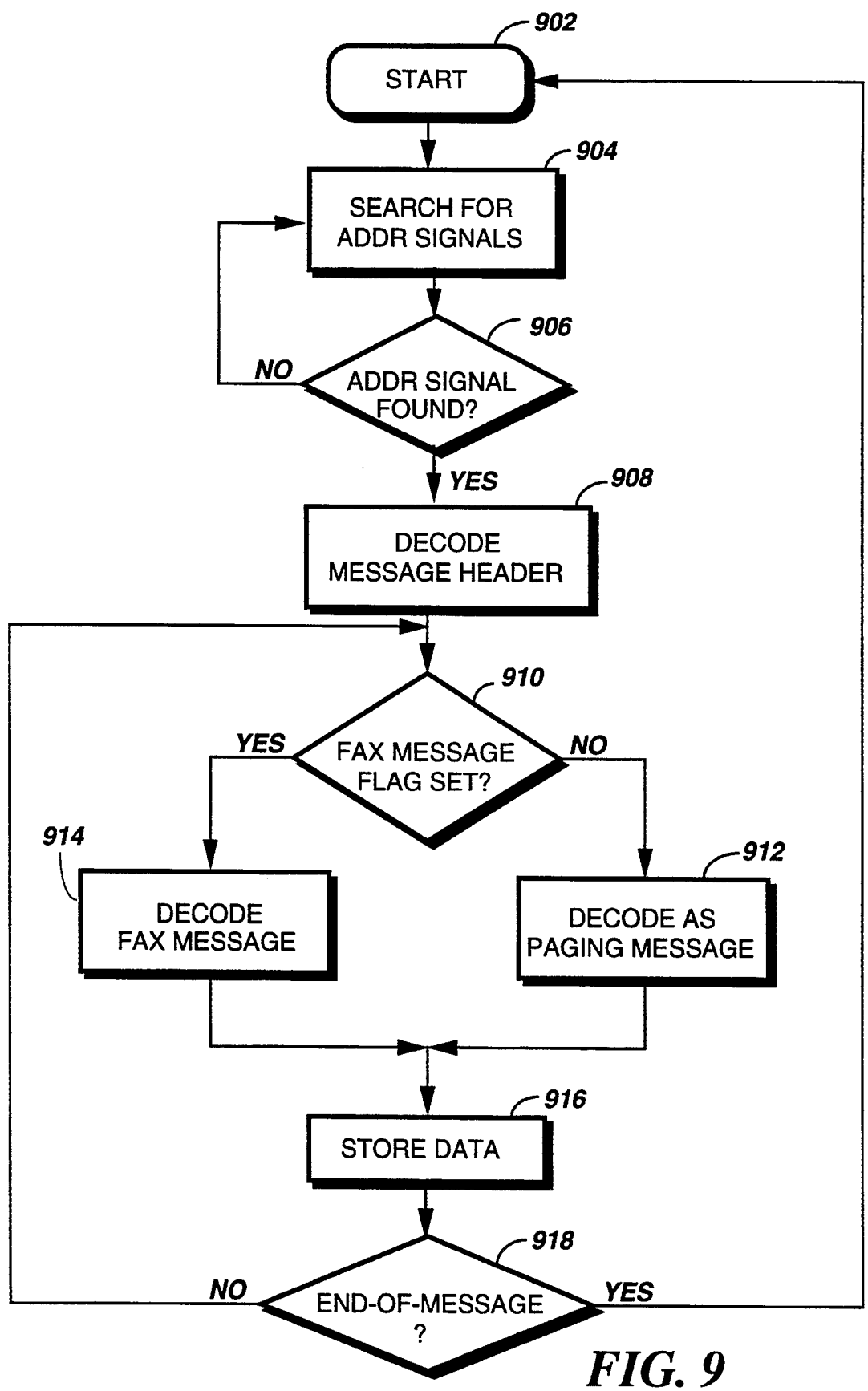
FIG. 9 is a flow diagram illustrating the operation of the selective call receiver in FIG. 2.

Referring to FIG. 9, the flow diagram illustrates the receiving operation of the selective call receiver of FIG. 2. The process of receiving a selective call message begins at step 902. In step 904, the address decoder searches a received signal for an address signal. Step 906 tests any recovered address signals to determine if they correlate with at least one predetermined address associated with the selective call receiver 40. If the received address does not correlate (match), control is returned to step 904 and a new search is performed. When a received address correlates with at least one predetermined address associated with the selective call receiver, step 908 decodes the message header then passes control to step 910. Step 910 tests for the presence of a FAX data flag. If step 910 is false, the following data block will contain symbols that will be decoded as a conventional paging message, step 912. When decoding is complete, step 916 stores the data and step 918 tests for an end of message condition which may be indicated by an end-of-message marker or the lack of another data flag. If step 918 is false (not yet at end of message) and step 910 is true, the following data block will contain a FAX message. The FAX message is decoded, step 914, and stored, step 916. When step 918 is true, control is returned to step 902 and the address decoder resumes searching for valid addresses.

The decoding of a text, symbol, or FAX data block is accomplished by applying the inverse of the procedures discussed in reference to FIG. 2. To display the received FAX message, each coded section is decoded and their respective positions mapped into the presentation device's display memory. After mapping the storing rectilinear coordinates into the presentation device's display space, message is re-assembled, at least one section, into a recovered document that substantially resembles the format of the original source document and the recovered document is presented.

In this way, the FAX message is encoded and transmitted to the designated selective call receiver. The selective call receiver, upon detecting its address, receives the FAX message which is stored and presented to the user on the display of the selective call receiver.

In summary, the preferred embodiment of the present invention comprises a selective call communication system or a facsimile transmission for communicating with at least one selective call receiver. The facsimile transmission system comprises a receiver for receiving a source document comprising a message. A region detector, coupled to the receiver, recovers the message from the source document; and an encoder, coupled to the region detector, encodes and compresses the message to form a compressed message. A controller transfers the compressed message to a selective call terminal for communicating with the at least one selective call receiver. The selective call terminal comprises a processor for processing the compressed message. The processor comprises an identifier for identifying white spaces in the compressed message and an eliminator, coupled to the identifier, for eliminating the white spaces being identified. The identifier further comprises a categorizer for categorizing the compressed message into a plurality of rows and columns. An accumulator, coupled to the categorizer, measures energy in each of the plurality of rows. A comparator, coupled to the accumulator, compares the energy being measured in each of the plurality of rows and columns with a threshold energy value for determining when a row of the plurality of rows or a column of the plurality of columns indicates an energy content greater than the threshold energy value. The comparator further comprises a detector for detecting high and low energy content rows and columns. A limiter, coupled to the detector, establishes a minimum distance between at least two high energy content rows or columns, and region selector, coupled to the limiter, defines a region incorporating at least one low energy content row or columns therebetween at least two high energy content rows or columns. A switch, coupled to the eliminator, disables the elimination of the at least one low energy row or column occurring in the region being defined. A selective call encoder, coupled to the eliminator, encodes the compressed message with at least one selective call address to form a selective call facsimile message, and a transmitter, coupled to the processor, transmits the selective call facsimile message to the at least one selective call receiver.

In this way, the invention requires the user to enter a message to be FAXed. The message is handwritten in a predefined information region which enables the message to be displayed easily on the display of the selective call receiver. After the message is processed by a conventional FAX machine, white spaces exceeding a threshold value is determinative that a line of the message can be eliminated without seriously degrading the message's integrity. This "blank line" elimination from the compressed message results in a second compression being performed on the compressed message. The second compression step reduces the Group III FAX encoded data to a message size that can be transmitted according to current paging standards without overloading the communication system. When encoded, the compressed message results in a message which elegantly fits within the constraints of the selective call communication without seriously degrading battery life or battery saving features. Therefore, the blank line elimination and the FAX machine data compression produce an encoded selective call FAX message that makes FAX transmission to a selective call receiver more attractive to both service providers and subscribers because the message is reduced to require a significant decrease in transmission time.

What is claimed is:

1. In a selective call communication system, a method of facsimile communication, comprising the steps of:
   (a) encoding and compressing data to form compressed data;
   (b) transferring the compressed data to a selective call terminal;
   (c) receiving the compressed data at the selective call terminal;
   (d) recovering compressed data within a predefined information region;
   (e) processing the recovered compressed data, the step of processing in the selective call terminal further comprises the steps of:
   (f) identifying white spaces in the recovered compressed data; and
   (g) eliminating the white spaces being identified; and
   (h) transmitting the recovered compressed data being processed to at least one selective call receiver.

2. The method according to claim 1 wherein the step of identifying further comprises the steps of:
   representing the recovered compressed data as an at least one codeword;

storing a plurality of threshold values indicative of codewords of the at least one codeword comprising substantially all white spaces; and comparing the at least one codeword with the plurality of threshold values; and determining, in response to the step of comparing, the codewords of the at least one codeword comprising substantially all white spaces.

3. The method according to claim 2 wherein the step of eliminating eliminates a line of the recovered compressed data in response to the step of determining at least one codeword of the line comprising substantially all white spaces.

4. The method according to claim 1 wherein the step of processing further comprises a step of downsampling for downsampling the recovered compressed data.

5. In a facsimile transmission system, a method of facsimile communication with at least one selective call receiver, comprising the steps of:

receiving a source document containing a message within an information region defined thereon;

encoding and compressing the message to form a compressed message;

transferring the compressed message to a selective call terminal for communicating with the at least one selective call receiver;

recovering the compressed message contained in the information region; and processing the recovered compressed message at the selective call terminal, the step of processing further comprises the steps of:

identifying white spaces in the recovered compressed message;

eliminating the white spaces being identified; and selective call encoding the recovered compressed message with at least one selective call address to form a selective call facsimile message; and transmitting the selective call facsimile message to the at least one selective call receiver.

6. The method according to claim 5 wherein the step of identifying further comprises the steps of:

representing the recovered compressed message as an at least one codeword;

storing a plurality of threshold values indicative of codewords of the at least one codeword comprising substantially all white spaces; and comparing the at least one codeword with the plurality of threshold values; and determining, in response to the step of comparing, the codewords of the at least one codeword comprising substantially all white spaces.

7. The method according to claim 6 wherein the step of eliminating eliminates a line of the recovered compressed message in response to the step of determining determining at least one codeword of said line comprising substantially all white spaces.

8. The method according to claim 5 wherein the step of processing further comprises a step of downsampling for downsampling the recovered compressed message.

9. A selective call communication system, comprising:

means for encoding and compressing data to form compressed data;

means for transferring the compressed data to a selective call terminal, the selective call terminal, comprising:

a receiver for receiving the compressed data; and means for recovering the compressed data within a predefined information region;

a processor for processing the recovered compressed data, the processor comprising:

means for identifying white spaces in the recovered compressed data; and means for eliminating the white spaces being identified; and a transmitter for transmitting the recovered compressed data being processed to at least one selective call receiver.

10. The selective call communication system according to claim 9 wherein the means for identifying further comprises:

means for representing the recovered compressed data as an at least one codeword;

a memory for storing a plurality of threshold values indicative of codewords of the at least one codeword comprising substantially all white spaces; and a comparator for comparing the at least one codeword with the plurality of threshold values; and means, in response to the comparator, for determining the codewords of the at least one codeword comprising substantially all white spaces.

11. The selective call communication system according to claim 10 wherein the means for eliminating eliminates a line of the recovered compressed data in response to the means for determining determining at least one codeword of the line comprising substantially all white spaces.

12. The selective call communication system according to claim 9 wherein the processor further comprises means for downsampling the recovered compressed data.

13. A facsimile transmission system for communicating with at least one selective call receiver, comprising:

a scanner for receiving a source document containing a message within an information region defined thereon; and means, coupled to the means for receiver, for encoding and compressing the message to form compressed message;

means, coupled to the means for encoding and compressing, for transferring the compressed message to a selective call terminal for communicating with the at least one selective call receiver, the selective call terminal comprising:

a receiver for receiving and recovering the compressed message contained in the information region;

a processor, coupled to the selective call receiver, for processing the recovered compressed message, the processor further comprising:

means for identifying white spaces in the recovered compressed message;

means, coupled to the means for identifying, for eliminating the white spaces being identified; and a selective call encoder, coupled to the means for eliminating, for encoding the recovered compressed message with at least one selective call address to form a selective call facsimile message; and a transmitter, coupled to the processor, for transmitting the selective call facsimile message to the at least one selective call receiver.

14. The facsimile transmission system according to claim 13 wherein the means for identifying further comprises:

means for representing the recovered compressed message as an at least one codeword;

a memory, coupled to the means for representing, for storing a plurality of threshold values indicative of codewords of the at least one codeword comprising substantially all white space; and a comparator for comparing the at least one codeword with the plurality of threshold values; and means, coupled to the comparator, for determining the codewords of the at least one codeword comprising substantially all white spaces.

15. The facsimile transmission system according to claim 14 wherein the means for eliminating eliminates a line of the recovered compressed message in response to the means for determining determining at least one codeword of said line comprising substantially all white spaces.

16. The facsimile transmission system according to claim 13 wherein the processor further comprises means for downsampling the recovered compressed message.

17. In a selective call communication system, a method of facsimile communication, comprising the steps of:

(a) encoding and compressing data to form compressed data;

(b) transferring the compressed data to a selective call terminal;

(c) receiving the compressed data at the selective call terminal; and (d) processing the received compressed data, the step of processing in the selective call terminal further comprises the steps of:

(e) identifying white spaces in the received compressed data; and (f) eliminating the white spaces being identified; and (g) transmitting the received compressed data being processed to at least one selective call receiver.

18. The method according to claim 17 wherein the step of identifying further comprises the steps of:

(h) categorizing the received compressed data into a plurality of rows;

(i) measuring energy in each of the plurality of rows; and (j) comparing the energy being measured in each of the plurality of rows with a threshold energy value for determining when a row of the plurality of rows indicates an energy content greater than the threshold energy value.

19. The method according to claim 17 wherein the step of processing further comprises a step of decompressing the received compressed data.

20. The method according to claim 19 wherein the step of identifying further comprises the steps of:

(i) categorizing the received compressed data being decompressed into a plurality of rows and a plurality of columns;

(j) measuring energy in each of the plurality of rows; and (k) comparing the energy being measured in each row of the plurality of rows with a row threshold energy value for determining when each row of the plurality of rows indicates an energy content greater than the row threshold energy value wherein said step of eliminating, in response thereto, eliminates each row indicating an energy content below the row threshold energy value; and (m) repeating steps (j), and (k) for the plurality of columns.

21. In a facsimile transmission system, a method of facsimile communication with at least one selective call receiver, comprising the steps of:

(a) receiving a source document comprising a message;

(b) encoding and compressing the message to form a compressed message;

(c) transferring the compressed message to a selective call terminal for communicating with the at least one selective call receiver;

(d) processing the compressed message being received by the selective call terminal, the step of processing further comprises the steps of:

(e) identifying white spaces in the received compressed message; and (f) eliminating the white spaces being identified;

(g) selective call encoding the received compressed message with at least one selective call address to form a selective call facsimile message; and (h) transmitting the selective call facsimile message to the at least one selective call receiver.

22. The method according to claim 21 wherein the step of identifying further comprises the steps of:

(j) categorizing the received compressed message into a plurality of rows;

(k) measuring energy in each of the plurality of rows; and (m) comparing the energy being measured in each of the plurality of rows with a threshold energy value for determining when a row of the plurality of rows indicates an energy content greater than the threshold energy value.

23. The method according to claim 21 wherein the step of processing further comprises a step of decompressing the received compressed message.

24. The method according to claim 23 wherein the step of identifying further comprises:

(i) categorizing the received compressed message being decompressed in a plurality of rows and a plurality of columns;

(j) measuring energy in each of the plurality of rows; and (k) comparing the energy being measured in each row of the plurality of rows with a row threshold energy value for determining when each row of the plurality of rows indicates an energy content greater than the row threshold energy value wherein said step of eliminating, in response thereto, eliminates each row indicating energy content below the row threshold energy value; and (m) repeating steps (j), and (k) for the plurality of columns.

25. The method according to claim 24 wherein the step of comparing further comprises the steps of:

(n) detecting high and low energy content rows and columns (o) establishing a minimum distance between at least two high energy content rows; and (p) defining regions incorporating low energy content rows therebetween at least two high energy content rows; and (q) disabling the step of eliminating for eliminating the low energy rows in the regions being defined; and (r) repeating steps (o), (p), and (q) for the high and low energy content columns being identified.

26. The method according to claim 25 wherein the step of detecting further comprises a step of accumulating for accumulating pixels for detecting the high and low energy rows and columns respectively.

27. A selective call communication system, comprising:
   means for encoding and compressing data to form compressed data;
   means for transferring the compressed data to a selective call terminal, the selective call terminal, comprising:
      a receiver for receiving the compressed data; and
      a processor for processing the received compressed data, the processor comprising:
         means for identifying white spaces in the received compressed data; and
         means, coupled to the means for identifying, for eliminating the white spaces being identified; and
      a transmitter for transmitting the received compressed data being processed to at least one selective call receiver.

28. The selective call communication system according to claim 27 wherein the means for identifying further comprises:
   means for categorizing the received compressed data into a plurality of rows;
   means, coupled to the means for categorizing, for measuring energy in each of the plurality of rows; and
   means, coupled to the means for measuring, for comparing the energy being measured in each of the plurality of rows with a threshold energy value for determining when a row of the plurality of rows indicates an energy content greater than the threshold energy value.

29. The method according to claim 27 wherein the processor further comprises means for decompressing the received compressed data.

30. The selective call communication system according to claim 29 wherein the means for identifying further comprises:
   means for categorizing the received compressed data being decompressed into a plurality of rows and a plurality of columns;
   means, coupled to the means for categorizing, for measuring energy in each of the plurality of rows and columns; and
   means, coupled to the means for measuring, for comparing the energy being measured in each row and each column of the plurality of rows and columns with a row and a column threshold energy value respectively for determining when each row and column of the plurality of rows and columns indicate an energy content greater than the row and column threshold energy values respectively wherein said means for eliminating, in response thereto, eliminates the row and the column indicating energy content below the row and column threshold energy values respectively.

31. A facsimile transmission system for communicating with at least one selective call receiver, comprising:
   a receiver for receiving a source document comprising a message;
   means, coupled to the receiver, for recovering the message from the source document; and
   means, coupled to the means for recovering, for encoding and compressing the message to form a compressed message;
   means for transferring the recovered compressed message to a selective call terminal for communicating with the at least one selective call receiver, the selective call terminal, comprising:
      a processor for processing the recovered compressed message, the processor comprising:
         means for identifying white spaces in the recovered compressed message; and
         means, coupled to means for identifying, for eliminating the white spaces being identified; and
      a selective call encoder, coupled to the means for eliminating, for encoding the recovered compressed message with at least one selective call address to form a selective call facsimile message; and
      a transmitter, coupled to the processor, for transmitting the selective call facsimile message to the at least one selective call receiver.

32. The facsimile transmission system according to claim 31 wherein the means for identifying comprises:
   means for categorizing the recovered compressed message into a plurality of rows;
   means, coupled to the means for categorizing, for measuring energy in each of the plurality of rows; and
   means, coupled to the means for measuring, for comparing the energy being measured in each of the plurality of rows with a threshold energy value for determining when a row of the plurality of rows indicates an energy content greater than the threshold energy value.

33. The facsimile transmission system according to claim 32 wherein the processor further comprises means for decompressing the recovered compressed message.

34. The facsimile transmission system according to claim 33 wherein the means for identifying further comprises:
   means for categorizing the recovered compressed message being decompressed into a plurality of rows and a plurality of columns;
   means, coupled to the means for categorizing, for measuring energy in each of the plurality of rows and columns; and
   means, coupled to the means for measuring, for comparing the energy being measured in each row and each column of the plurality of rows and columns with rows and columns threshold energy values respectively for determining when each row and each column of the plurality of rows and columns indicate an energy content greater than the row and column threshold energy value respectively wherein said means for eliminating, in response thereto, eliminates the row and column indicating an energy content below the respective row and column threshold energy values.

35. The facsimile transmission system according to claim 34 wherein the means for comparing further comprises:
   means for detecting high and low energy content rows;
   means, coupled to the means for detecting, for establishing a minimum distance between at least two high energy content rows; and means, coupled to the means for establishing, for defining a region incorporating the at least two high energy content rows; and means, coupled to the means for eliminating, for disabling the elimination of an at least one low energy row occurring in the region being defined.

36. The method according to claim 35 wherein the means for detecting comprises means of accumulating pixels for detecting the high and low energy rows.

37. A facsimile transmission system for communicating with at least one selective call receiver, the facsimile transmission system comprising:

a receiver for receiving a source document comprising a message;

a region detector, coupled to the receiver, for recovering the message from the source document; and an encoder, coupled to the region detector, for encoding and compressing the message to form a compressed message;

a controller for transferring the compressed message to a selective call terminal for communicating with the at least one selective call receiver, the selective call terminal, comprising:

a processor for processing the compressed message, the processor comprising:

an identifier for identifying white spaces in the compressed message;

an eliminator, coupled to the identifier, for eliminating the white spaces being identified;

the identifier further comprises:

a categorizer for categorizing the compressed message into a plurality of rows;

an accumulator, coupled to the categorizer, for measuring energy in each of the plurality of rows; and a comparator, coupled to the accumulator, for comparing the energy being measured in each of the plurality of rows with a threshold energy value for determining when a row of the plurality of rows indicates an energy content greater than the threshold energy value, the comparator further comprises:

a detector for detecting high and low energy content rows;

a limiter, coupled to the detector, for establishing a minimum distance between at least two high energy content rows; and region selector, coupled to the limiter, for defining a region incorporating at least one low energy content row therebetween at least two high energy content rows; and a switch, coupled to the eliminator, for disabling the elimination of the at least one low energy row occurring in the region being defined;

a selective call encoder, coupled to the eliminator, for encoding the compressed message with at least one selective call address to form a selective call facsimile message; and a transmitter, coupled to the processor, for transmitting the selective call facsimile message to the at least one selective call receiver.

* * * * *

UNITED STATES PATENT AND TRADEMARK OFFICE
CERTIFICATE OF CORRECTION

PATENT NO. : 5,387,981
DATED : February 7, 1995
INVENTOR(S) : Noah Orlen, Zaffer Merchant It is certified that error appears in the above-indentified patent and that said Letters Patent is hereby corrected as shown below:

Column 13, line 11, after determining insert --determining--.

Signed and Sealed this

Twenty-eighth Day of November 1995

Attest:

BRUCE LEHMAN

*Attesting Officer*  *Commissioner of Patents and Trademarks*